July 19, 1960  A. R. MEYER  2,945,943
WELDING SHIELDING AND CONTROL DEVICE
Filed June 19, 1957  3 Sheets-Sheet 1
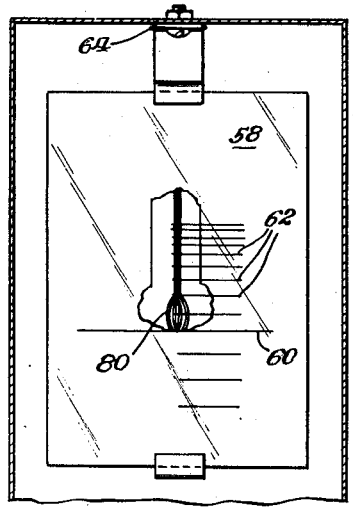
Fig. 4.
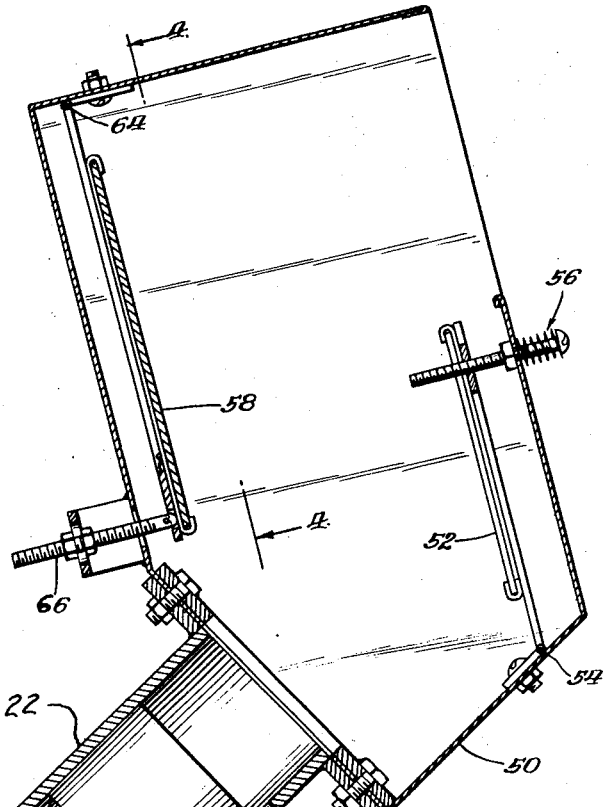
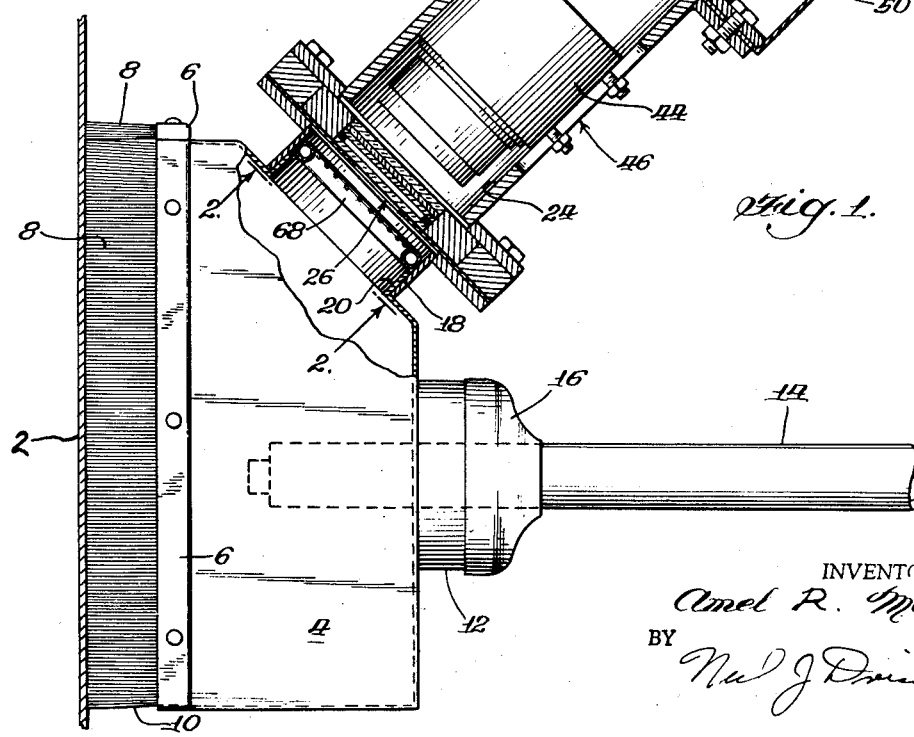
Fig. 1.
INVENTOR.
Arnel R. Meyer
BY
Atty.

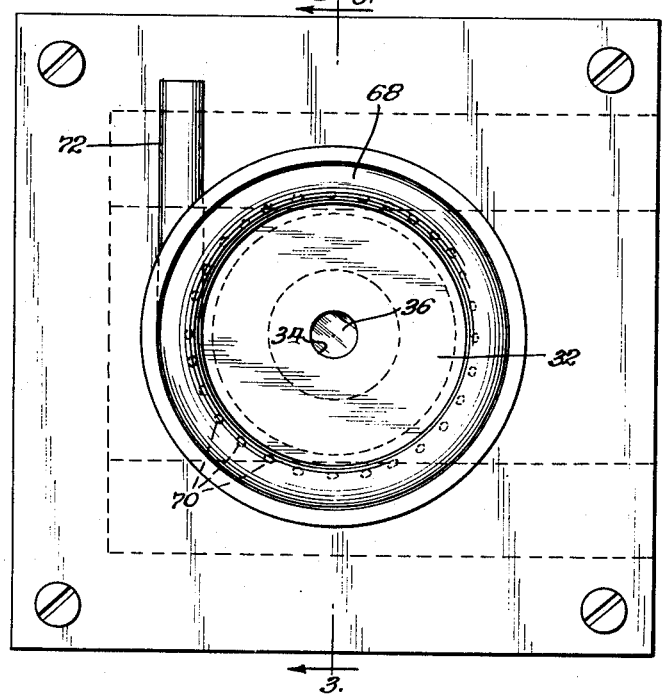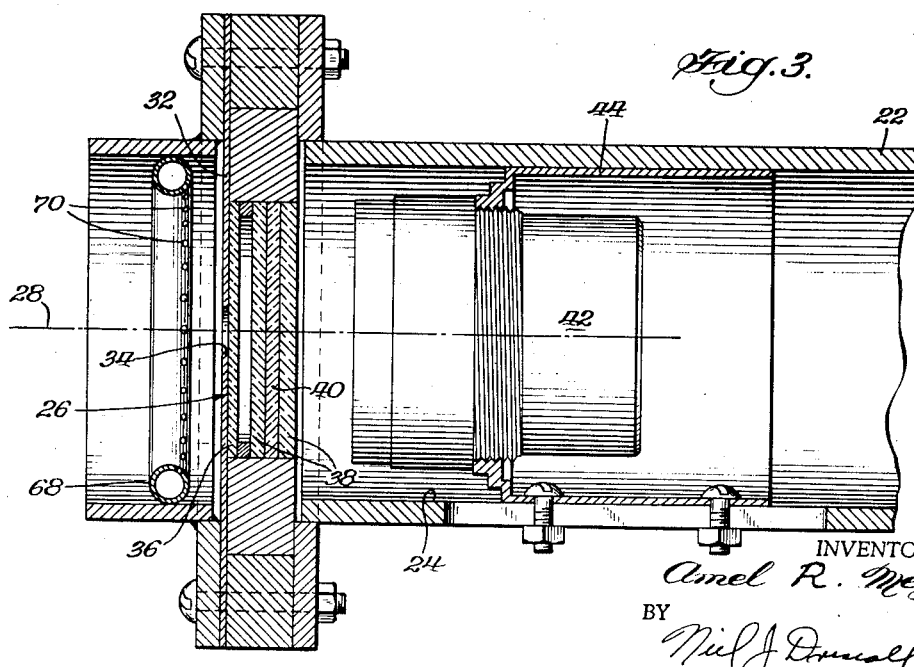

United States Patent Office 2,945,943
Patented July 19, 1960

2,945,943
WELDING SHIELDING AND CONTROL DEVICE

Amel R. Meyer, Griffith, Ind., assignor, by mesne assignments, to Union Tank Car Company, Chicago, Ill., a corporation of New Jersey Filed June 19, 1957, Ser. No. 666,607

1 Claim. (Cl. 219—147)

The invention relates to a shielding and control device of particular utility in association with inert gas shield welding processes.

As is well known in the art, inert gas shielded welding processes normally fall into two classifications, that is, non-consumable and consumable electrode types. In both types the inert atmosphere must be maintained around the weld site in order to avoid atmospheric dilution and possible oxidation of the molten weld metal. It is also generally true that higher current densities as well as other reasons associated with this type of welding results in an abnormally high degree of ultraviolet radiation from the welding site thereby substantially increasing physical danger to nearby operating personnel. Another important consideration in effecting quality welds with the above methods is that observable arc length rather than measured welding circuit voltage provides, from a practical standpoint, better welding control. Of course, the mentioned increased radiation renders such observation very difficult without the use of cumbersome and inefficient protecting devices by the welding operator. It will therefore be seen that increased use of inert gas shielded arc welding has created many problems from the standpoint of quality welds and protection of operating personnel.

It is therefore a general object of the invention to provide a device that will effectively shield the welding site and accommodate efficient and accurate control of the welding process while eliminating the mentioned difficulties with this type of welding.

It is a specific object of the invention to provide a device of the type described that will effectively shield the welding arc atmosphere from disturbance and dilution.

It is a further specific object of the invention to provide a device of the type described that will protect operating personnel without necessitating the use of cumbersome protecting equipment.

It is also a specific object of the invention to provide a device of the type described that admits of efficient welding control by accommodating direct and continuous observation and measurement of welding arc length.

Figure 5:
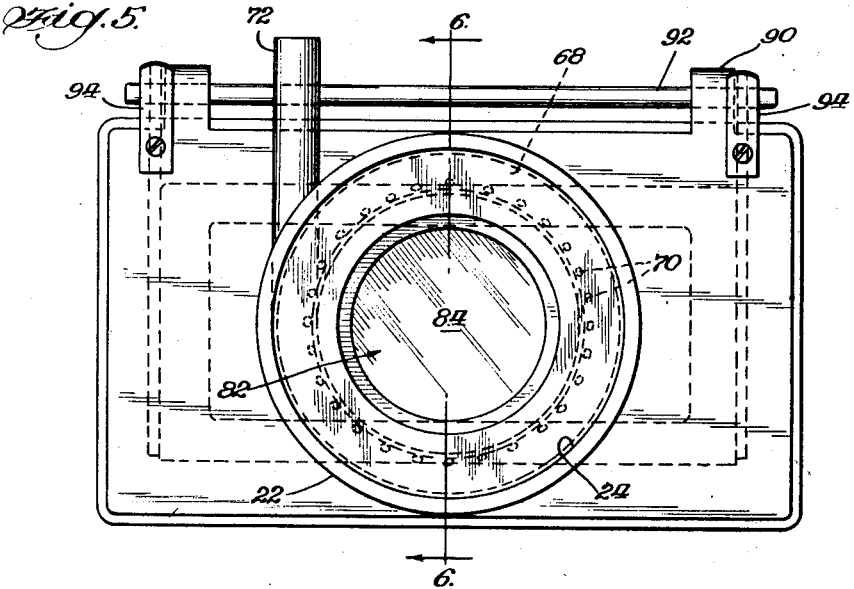
Figure 6:
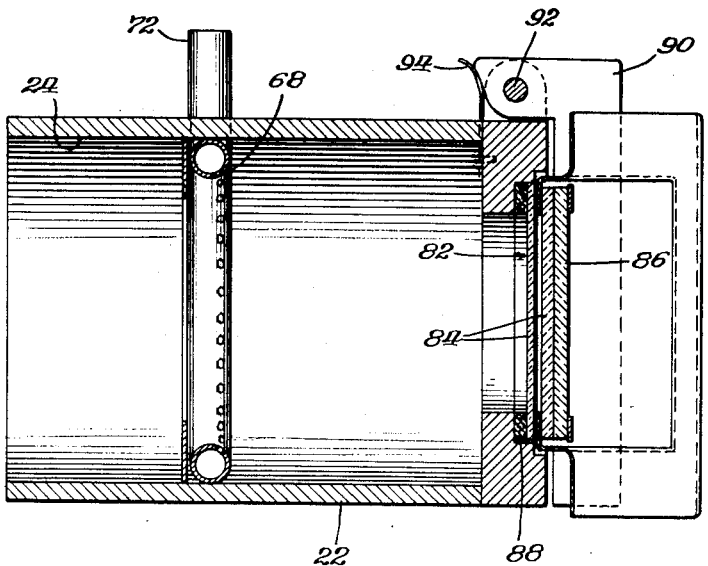

These and other objects of the invention will become apparent in the course of the following description and from an analysis of the concerned drawings, wherein:

Figure 1 is a side elevational view, partially in section, of a preferred embodiment of the invention, Figure 2 is a sectional view taken approximately along line 2—2 of Figure 1, Figure 3 is a fragmentary sectional view taken along line 3—3 of Figure 2, Figure 4 is a fragmentary sectional view taken along line 4—4 of Figure 1, Figure 5 is a view similar to Figure 2 but illustrating a slight modification of the invention, and Figure 6 is a sectional view taken along line 6—6 of Figure 5.

Describing the invention in detail and directing attention to Figure 1, the numeral 2 indicates plates to be welded, the plates being shown in vertical position it being understood that the invention may be arranged to be used on welding sites in a variety of positions.

A box-like enclosure 4 may be mounted adjacent the plates 2 in the area of the weld site, said box-like enclosure having an open end (not shown) directed toward the plates 2. A plurality of mounting members 6, 6 are secured to the enclosure 4 peripherally around the open end thereof, said mounting members being arranged to carry flexible elements here shown as wire brushes 8, 8 which abut the surface of the plate 2 in a flexible manner to move therealong during welding action and maintain an intimate contact with the plate surface regardless of surface irregularities. Flexible elements are preferably not provided in a small area 10 at one side of the enclosure 4 whereby a small opening is provided to accommodate the escape of gases, welding spatter and the like during the welding operation. Normally, the welding operation will move along the plates 2 in an upward direction as seen in Figure 1.

An electrode opening 12 is provided at one side of the enclosure 4 to receive an electrode carrier 14 which extends into the enclosure 4 to a point which is in appropriate operative relation with the welding site. It will be understood that carrier 14, in addition to delivering welding rod and current to the welding site, is also constructed so that inert gas is pressure fed into the enclosure 4 via suitable passages (not shown) in the electrode carrier 14 and in a conventional manner. It is this force feeding of inert gas into the enclosure 4 that causes a pressure build up therein, eventual evacuation of normal atmospheric gases and the complete submergence of the welding arc in the inert gas present in the enclosure 4. The higher pressure in the enclosure 4 will cause some of the inert gas to be forced through the opening 10 to the atmosphere. Further, a flexible seal 16 is provided at the electrode opening 12 to effectuate a substantially gas tight seal at that point. A mounting member 18 is provided at an upper portion of the enclosure 4 and defines an opening 20, said member 18 being in sealed engagement with a cylinder 22 which in turn defines a chamber 24 located outboardly of the enclosure 4.

Directing attention to Figure 3, it will be seen that the cylinder 22 is provided with a plurality of lenses indicated generally at 26 extending across the entire cross-section of the cylinder 22. It will also be noted that the axis 28 of the cylinder 22 is preferably in angular relationship to the surface of the plates 2. A typical lens arrangement that may be employed includes a member 32 having a co-axial central aperture 34 therein, a clear splatter glass 36, clear glass elements 38, 38, a welding lens 40, effective to reduce light intensity, and a magnifying lens 42 all in series relationship to the chamber 24 and co-axial with the axis 28. The magnifying lens 42 may be mounted in a device 44, said device 44 being in slidable relationship with the chamber 24 so that the position of the lens 42 may be varied in order to obtain proper focus. A bolt and slot arrangement indicated generally at 46 may be employed to facilitate movement of the lens 42 and to secure same in any desired position.

Attached to the other end of the cylinder 22 is a housing 50, said housing having a mirror element 52 mounted therein and in alignment with the axis 28 of the cylinder 22. The lower end of the mirror 52 may be pivoted, as at 54, and its upper end may be provided with an adjusting bolt arrangement 56 so that the angle of the mirror in relation to the axis 28 may be adjusted to offer the desired reflection hereinafter described in detail.

Also located in the housing 50 is a screen 58, said screen 58 being in reflective alignment with the mirror 52, as best seen in Figure 1, said screen having a base line 60 and a plurality of indicating lines 62 thereon, said lines having predetermined spacings to accurately reflect the true length of welding arc projected on the screen as hereinafter described. The screen 58 may be pivoted as at 64 at its upper end and provided with an adjustable member 66 at its lower end again to facilitate proper locating of the projected image thereon.

A particular feature of the invention relates to a ring member 68 located in chamber 24 intermediate lens arrangement 26 and the plate 2. Referring to Figures 2 and 3, it will be seen that the ring member 68 defines an internal passage having a plurality of apertures 70, 70 communicating therewith and directed inwardly toward the axis 28 of the chamber 24. A portion of the ring member 68 communicates with an incoming pipe 72 arranged to convey inert gas from a source (not shown) to the ring member 68 whereby gas flow induced in the ring member escapes through the apertures 70 into the chamber 24 adjacent the lens arrangement 26 to purge the chamber 24 and aid in preventing discoloration of the lens arrangement due to welding activity. It will be noted that the apertures 70 are located on the side of the ring member 68 adjacent the lens arrangement 26. The result of such structure is that flow of inert gas will therefore be directed both toward the lens and the central axis. This purging of the chamber 24 accommodates long term clear arc viewing during the welding operation.

In normal operation welding current is delivered to the welding site to provide a welding arc to the plate 2. As noted earlier, practical considerations indicate that the length of the welding arc is the best and most accurate control of the welding operation to obtain quality welds. The lens arrangement 26 transmits the light created by the welding arc through the magnifying lens 42 to the mirror 52 whereat it is reflected to the screen 58. The mirror 52 and the screen 58 may be adjusted so that one edge of the welding arc is located on the base line 60 and the lines 62 accurately indicate the total length of the arc, the arc being illustrated at 80 in Figure 4. The welding operator is merely required to carefully watch the screen 58 to determine the length of the arc 80 and to thereafter control the weld current as the arc varies from the desired length.

The enclosure 4 and particularly the flexible members 8 associated therewith protect the weld site to provide an undiluted and undisturbed atmosphere therearound.

Considering the embodiment of Figures 5 and 6, the housing 50 and its contained mirror 52 and screen 58 have been eliminated. Again a purging ring 68 is disposed in the chamber 24 and for the same purpose as hereinbefore described. A new lens arrangement indicated generally at 82 comprises clear lenses 84, 84 in series relation with a welding lens 86 arranged to control light intensity. The entire lens arrangement 82 may be suitably mounted in the chamber 24 by the use of resilient backing 88 or the like. If desired, a shield member 90 may be provided to cover the arrangement 2, said shield 90 being pivoted as at 92 and spring loaded as at 94 so that it may be raised by the operator to directly view the welding arc.

It will be now understood that I have provided a novel shield arrangement which effectively prevents dilution of an inert gas shield employed in this type of welding and further provides means to accommodate continuous visual inspection of the arc per se thereby aiding in effective welding control. The arrangement reduces to a minimum ultra-violet danger to operating personnel and eliminates the necessity of cumbersome and inefficient protective clothing and devices.

The invention as shown is by way of illustration and not limitation and may be subject to various modifications without departing from the spirit thereof and the scope of the appended claim.

What is claimed is:

In a device for use in the arc welding of metallic plates under an inert gas shield, the combination of a box-like enclosure having an open side extending toward said plates, means peripherally mounted along said open side for flexibly engaging said plates, a welding electrode extending through said enclosure and in operative relation with a welding site on said plates, a tube mounted on said enclosure and having a long axis in acute angular relationship with said electrode and said plates, a viewing lens in the end of said tube, a mirror in alignment with said axis and spaced from said lens, a screen operatively aligned with said mirror to receive an image of the welding arc at said welding site, means to deliver inert gas to said enclosure including a delivery pipe extending into said tube and surrounding said axis, said pipe being adjacent said lens and having a plurality of apertures for directing said inert gas into siad tube and over the inner surface of said lens.

References Cited in the file of this patent

UNITED STATES PATENTS

| | | |
|---|---|---|
| 1,749,765 | Hendrickson | Mar. 11, 1930 |
| 2,194,573 | Schultz | Mar. 26, 1940 |
| 2,210,370 | Herradora | Aug. 6, 1940 |
| 2,410,306 | Romberg | Oct. 29, 1946 |
| 2,557,046 | Evans | June 12, 1951 |
| 2,590,084 | Bernard | Mar. 25, 1952 |
| 2,871,334 | Cooper | Jan. 27, 1959 |